United States Patent
Fujiwara et al.

(10) Patent No.: US 7,062,963 B2
(45) Date of Patent: Jun. 20, 2006

(54) FLOW VELOCITY MEASURING DEVICE

(75) Inventors: Toshimitsu Fujiwara, Shiga-ken (JP); Satoshi Nozoe, Toyonaka (JP); Naotsugu Ueda, Shiga-ken (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 11/067,149

(22) Filed: Feb. 25, 2005

(65) Prior Publication Data

US 2005/0188760 A1 Sep. 1, 2005

(30) Foreign Application Priority Data

Feb. 27, 2004 (JP) ............................. 2004-054475

(51) Int. Cl.
*G01F 1/68* (2006.01)
(52) U.S. Cl. .................................... 73/202.5
(58) Field of Classification Search ............... 73/202.5, 73/204.22, 118.2, 204.21
See application file for complete search history.

(56) References Cited

U.S. PATENT DOCUMENTS 6,647,776 B1* 11/2003 Kohmura et al. ......... 73/204.21
6,868,122 B1* 3/2005 O'Neill ................. 375/240.12

FOREIGN PATENT DOCUMENTS

JP 11-166720 6/1999

OTHER PUBLICATIONS

Patent Abstracts of Japan, Publication No. 11-166720 dated Jun. 22, 1999, one page.

* cited by examiner

*Primary Examiner*—Jewel V. Thompson
(74) *Attorney, Agent, or Firm*—Osha Liang L.L.P.

(57) ABSTRACT

A flow velocity measuring device is able to conduct a fluid to a sensor element after removal of dust and dirt contained in the fluid to accurately measure the flow velocity of the fluid even when the fluid is low in flow velocity and the device is mounted in any direction. A flow passage is formed by internal spaces, which have curved wall surfaces, introduction passages connected to the internal spaces at one ends of the wall surfaces tangentially to the wall surfaces, discharge passages connected to the internal spaces at the other ends of the wall surfaces tangentially to the wall surfaces, and branch discharge passages connected to the internal spaces at substantially right angle to a direction, in which the wall surfaces are curved, and a sensor element is arranged in the branch passage or a flow passage connected to the branch passage.

18 Claims, 8 Drawing Sheets

FLOW VELOCITY MEASURING DEVICE

BACKGROUND OF THE INVENTION

1. Field of the Invention

The present invention relates to a flow velocity measuring device.

2. Description of Related Art

With electronic equipment such as personal computers cooled by a cooling fan, etc., reduction in air volume due to plugging of a filter incurs a decrease in cooling capacity to cause a fear that hindrance is generated in the function of the equipment, and so a flow velocity measuring device is used to monitor the wind velocity at all times so that when air volume is decreased, a fan is increased in revolutions and an alarm is given to a user. Conventionally, flow velocity measuring devices adopted in such use are constructed to arrange a sensor element in a flow passage to measure the flow velocity of an air. However, there is caused a problem that when conventional flow velocity measuring devices are used over a long term, dust and dirt in an air adhere to and accumulate on a sensor element to cause degradation in accuracy.

In order to solve the problem, JP-A-11-166720 discloses a device, in which a trap wall is provided in a flow passage and inertia of dust and dirt causes dust and dirt in an air flow to be caught by the trap wall, after which the air flow is conducted to a sensor element. However, the device disclosed in JP-A-11-166720 has a disadvantage that when the flow velocity of an air flow is low, dust and dirt are insufficient in inertia to be adequately separated, and involves a problem that when mounted horizontally, dust and dirt once caught by the trap wall positioned above the flow passage fall again in the air flow to be carried to the sensor element, so that the device is limited in an applicable range.

SUMMARY OF THE INVENTION

Hereupon, it is an object of the invention to provide a flow velocity measuring device capable of conducting a fluid to a sensor element after removal of dust and dirt contained in the fluid to enable accurately measuring the flow velocity of the fluid even when the fluid is low in flow velocity and the device is mounted in any direction.

The invention provides a flow velocity measuring device comprising a flow passage composed of an internal space having a curved wall surface, an introduction passage connected to the internal space at one end of the wall surface tangentially to the wall surface, a discharge passage connected to the internal space at the other end of the wall surface tangentially to the wall surface, and a branch passage connected to the internal space at substantially right angle to a direction (a direction of a plane substantially including a direction, in which the introduction passage and the discharge passage are connected together), in which the wall surface is curved, and a sensor element arranged in the branch passage or a flow passage connected to the branch passage, and wherein a fluid is introduced into the internal space from the introduction passage to branch into the discharge passage and the branch passage, and the flow velocity of the fluid taken out from the branch passage is measured by the sensor element.

With this construction, when the flow velocity measuring device is placed in a fluid flow, a fluid is introduced from the introduction passage to the inner space by the fluid flow and the fluid flows along the curved wall surface of the internal space to be discharged from the discharge passage. At this time, dust and dirt contained in the fluid is locally distributed near the wall surface trying to go straight according to a law of inertia, so that a pure fluid with less dust and dirt is obtained in a region distant from the wall surface of the internal space. The pure fluid can be taken out from the internal space without disturbing a flow of the fluid along the wall surface from the branch passage provided at substantially right angle to a direction along the introduction passage, the discharge passage, and the wall surface connecting between the both passages. Since the flow velocity of the pure fluid is dependent upon the flow velocity of a fluid outside the flow velocity measuring device, the flow velocity of a fluid outside can be found by measuring the flow velocity of the pure fluid with the sensor element. Also, since inertia of dust and dirt can be caused by largely bending a direction, in which a fluid flows along the wall surface, to act, dust and dirt is separated even when the flow velocity of the fluid is small, thus enabling measurement of the flow velocity.

Also, the flow velocity measuring device according to invention may comprise at least two internal spaces connected in series so that a fluid taken out from the branch passage connected to one of the internal spaces is conducted to the introduction passage connected to the other of the internal space, and/or the branch passages connected to the plurality of internal spaces may be connected to one another. Further, the internal spaces may be arranged so that all directions of the discharge passages and/or the branch passages are not made parallel to one another, preferably the discharge passages and/or the branch passages may be made different by 90 degrees or more in direction.

In this manner, when the internal spaces are connected together in series, it is possible to surely remove dust and dirt from a fluid fed to the sensor element. Even with the internal spaces connected together in parallel, the internal spaces are individually made small provided that the flow velocities in the respective internal spaces are made equal to the flow velocity in the case of the internal space being single, and so a radius of curvature becomes small, so that the effect of separation of dust and dirt owing to inertia is heightened. Also, even when one of the internal spaces or any flow passage connected to the internal space is plugged, a path extending through the other internal spaces functions, so that measurement of flow velocity can be done by adjustment of sensitivity. Also, depending upon the positional relationship between the branch passages, through which a pure air is taken out from the internal spaces, and the discharge passages, through which dust and dirt are carried out, in particular, when the discharge passages are positioned above openings of the branch passages, a part of dust and dirt falls in some cases into the fluid, which is separated by gravitation from flows leading to the discharge passages and taken out into the branch passages. When the plurality of internal spaces are connected with directions of the branch passages being changed, and/or arranged with directions of the branch passages being changed, preferably the branch passages in directions different by 90° or more, more preferably 180°, the discharge passage is not positioned above the opening of the branch passage in at least one of the internal spaces, so that it is possible to optimally perform separation of dust and dirt.

Also, with the flow velocity measuring device according to the invention, the internal space may be cylindrical in shape and the branch passage may comprise a cylinder projecting into the internal space.

When the internal space is cylindrical in shape, a fluid flow describes a circle and so inertia of dust and dirt acts as a centrifugal force perpendicular to a direction of fluid flow at all times to face the wall surface, which is most efficient. Also, provided that the branch passage comprises a cylinder projecting into the internal space, dust and dirt separated by gravitation from the flow cannot get over the cylinder and so does not flow into the branch passage even when the branch passage is arranged in a manner to be positioned below the internal space.

Also, a further aspect of the invention provides a flow velocity measuring device comprising a first layer substrate, a second layer substrate, and an intermediate plate interposed between the first layer substrate and the second layer substrate, a first layer flow passage provided between the first layer substrate and the intermediate plate and including an internal space having a curved wall surface, an introduction passage connected to the internal space at one end of the wall surface tangentially to the wall surface, and a discharge passage connected to the internal space at the other end of the wall surface tangentially to the wall surface, a branch passage provided on the intermediate plate to extend through the intermediate plate to be connected to the internal space, a second layer flow passage provided between the intermediate plate and the second layer substrate to be connected to the branch passage, a sensor element provided on the first layer substrate or the second layer substrate to be arranged in the second layer flow passage or a flow passage connected to the second layer flow passage, and wherein a fluid is introduced into the internal space from the introduction passage to branch into the discharge passage and the branch passage, and the flow velocity of the fluid taken into the second layer flow passage from the branch passage is measured by the sensor element.

With this construction, the first layer flow passage, the second layer flow passage, and the branch passage can construct a three-dimensional flow-passage. Thereby, since flow passages can be connected in a direction perpendicular to the fluid flow direction, or in a direction of twist, dust and dirt contained in the fluid can be removed by inertia of the dust and dirt and only a clean fluid can be taken out to be conducted to the sensor element for measurement of flow velocity.

Also, in the flow velocity measuring device according to the invention, the second layer flow passage may comprise a groove provided on the intermediate plate, the second layer substrate may comprise a circuit substrate provided with the sensor element and a circuit, which processes a signal input into or output to the sensor element, and the first layer substrate may define a part of a housing to accommodate the intermediate plate and the second layer substrate.

With this construction, the groove provided on the intermediate plate is closed by the circuit substrate provided with an electronic circuit for the sensor element to configure the second layer flow passage, so that the number of parts is decreased and the construction is made simple. Also, the construction is made simple by making the first layer substrate integral with that structure, which accommodates therein the whole device.

Also, in the flow velocity measuring device according to the invention, the first layer flow passage may include at least two internal spaces, the intermediate plate may be provided with a communication hole, which extends through the intermediate plate from the introduction passage connected to one of the internal spaces, and the second layer flow passage may be arranged to provide communication between the branch passage connected to the other of the internal spaces and the communication hole, or the second layer flow passage may be arranged to provide communication between the branch passage connected to one of the internal spaces and the branch passage connected to the other of the internal spaces.

By communicating the branch passage of any one of the internal spaces to the introduction passage of the other internal space, a further pure fluid can be conducted to the sensor element through separation twice, and by communicating the branch passage of any one of the internal spaces to the branch passage of the other internal space, the plurality of internal spaces are connected in parallel to be able to conduct a pure fluid to the sensor element from the other internal space, the introduction passage, the discharge passage or the branch passage even when one of the internal spaces, the introduction passage, the discharge passage or the branch passage is plugged.

Also, in the flow velocity measuring device according to the invention, directions of the discharge passages connected to the internal spaces may be different by 90° or more, preferably 180°.

With this construction, by changing directions of the discharge passages, the discharge passages are arranged such that dust and dirt in at least one of the internal spaces become hard to flow into the branch passage by gravitation, so that irrespective of a direction of mounting, a high accuracy is obtained in the flow velocity measuring device according to the invention.

Also, in the flow velocity measuring device according to the invention, the internal spaces may be cylindrical-shaped, and the branch passage may comprise a cylinder projecting into the internal space.

By projecting the opening of the branch passage into the internal space, dust and dirt in a fluid is hard to enter into the through-hole by gravitation even when the flow velocity measuring device is mounted with the intermediate plate disposed under. Also, by making the internal spaces cylindrical-shaped, flows of a fluid describe a circle, so that separation of dust and dirt is efficient.

As described above, for a fluid at low flow velocity and even when the device is mounted in any direction, it is possible according to the invention to remove dust and dirt in a fluid to conduct the fluid to a sensor element to accurately measure the flow velocity of the fluid over a long term.

DETAILED DESCRIPTION OF THE PREFERRED EMBODIMENTS

Figure 1:
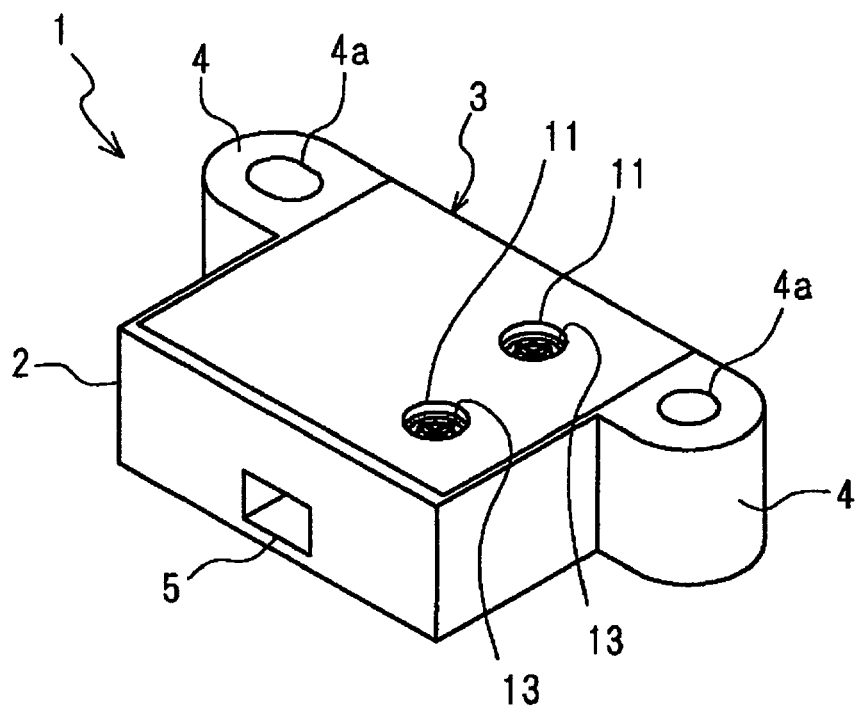
FIG. 1 is a perspective view showing a flow velocity measuring device, according to an embodiment of the invention, as viewed from obliquely upwardly of the front.
Figure 2:
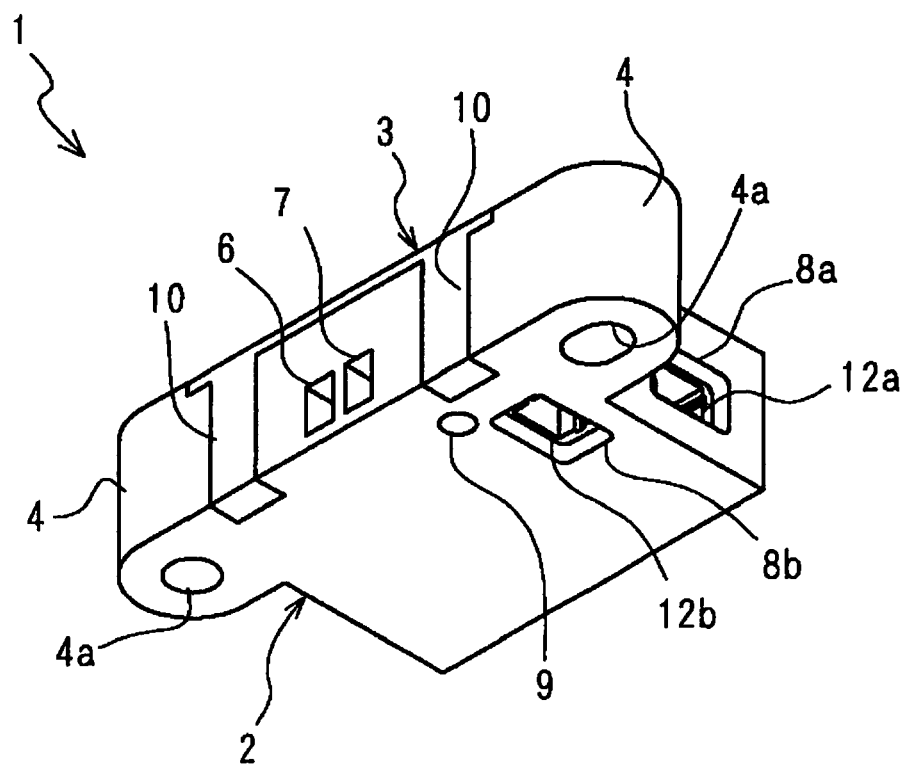
FIG. 2 is a perspective view showing the flow velocity measuring device of FIG. 1 as viewed from obliquely downwardly of the back.

FIGS. 1 and 2, respectively, are views showing a flow velocity measuring device 1, according to an embodiment of the invention, as viewed from obliquely upwardly of the front and obliquely downwardly of the back. The flow velocity measuring device 1 mainly serves to measure the flow velocity of an air, and comprises a housing 2 including a first layer substrate and a cover 3. The housing 2 is shaped to provide overhangs 4 on sides of a rectangular solid, the overhangs having screw holes 4a for fixation of the flow velocity measuring device 1 to a location of measurement, the housing including an intake port 5 on a front surface thereof for taking in a flow of an air being measured, a first discharge port 6 and a second discharge port 7 on a back surface thereof, a first connector hole 8a on a side thereof, and a second connector hole 8b and a positioning hole 9 on a bottom surface thereof. The cover 3 is mounted on an upper surface of the housing 2 by means of two hooks 10 for engagement with the back surface of the flow velocity measuring device 1 and provided with two trimmer holes 11. A first connector 12a and a second connector 12b, respectively, are provided in the first connector hole 8a and the second connector hole 8b to be connected in parallel, and only one of the first connector 12a and the second connector 12b is used to be able to connect the flow velocity measuring device 1 to an external equipment. Trimmers 13 provided in the two trimmer holes 11, respectively, serve to adjust sensitivity of the flow velocity measuring device 1.

Figure 3:
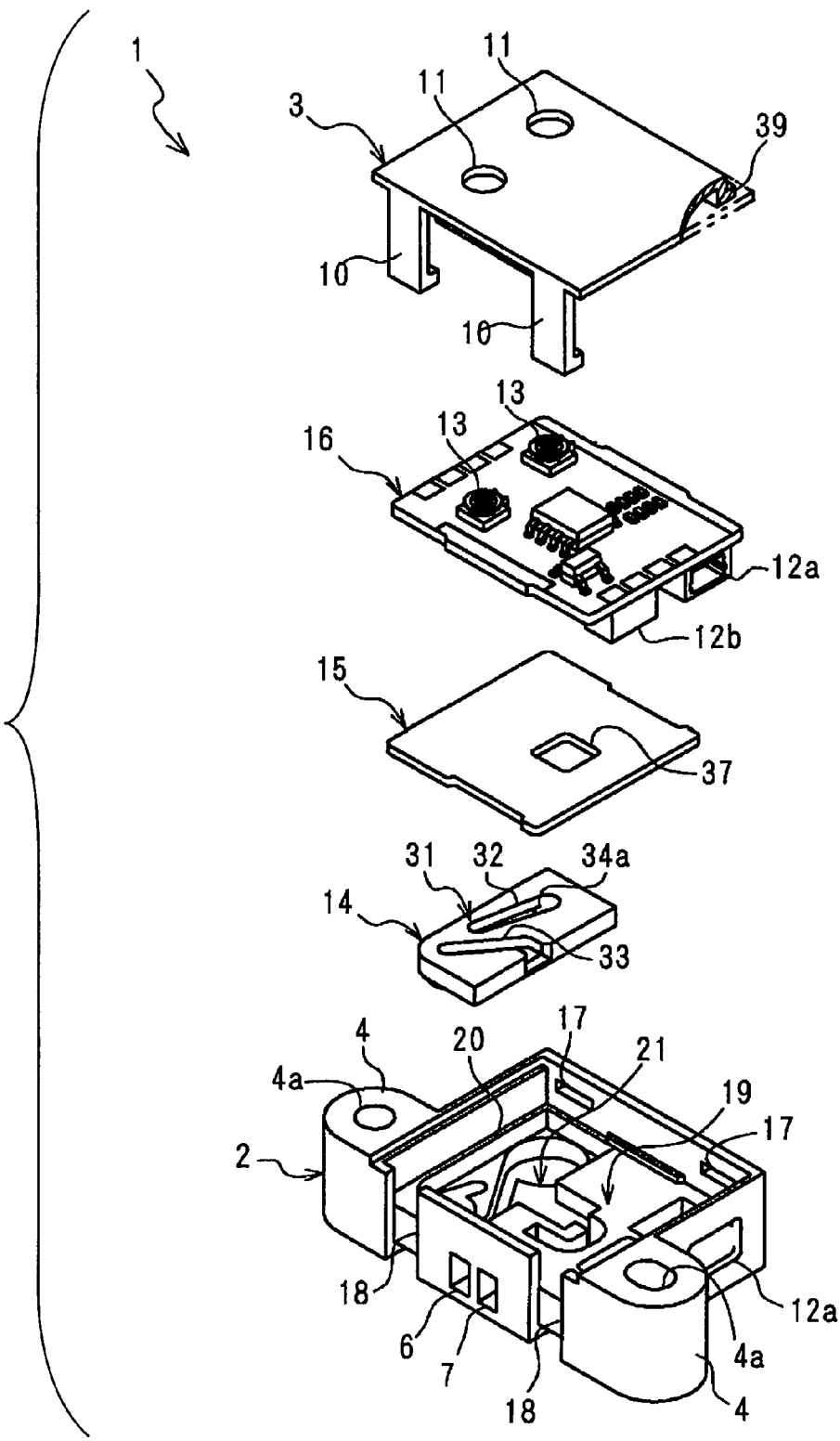
FIG. 3 is an exploded, perspective view showing the flow velocity measuring device of FIG. 1.

Further, as shown in FIG. 3, the flow velocity measuring device 1 accommodates an intermediate plate 14, a packing 15, and a circuit substrate 16, which makes a second layer substrate, in the housing 2 to secure them with the cover 3.

Figure 4:
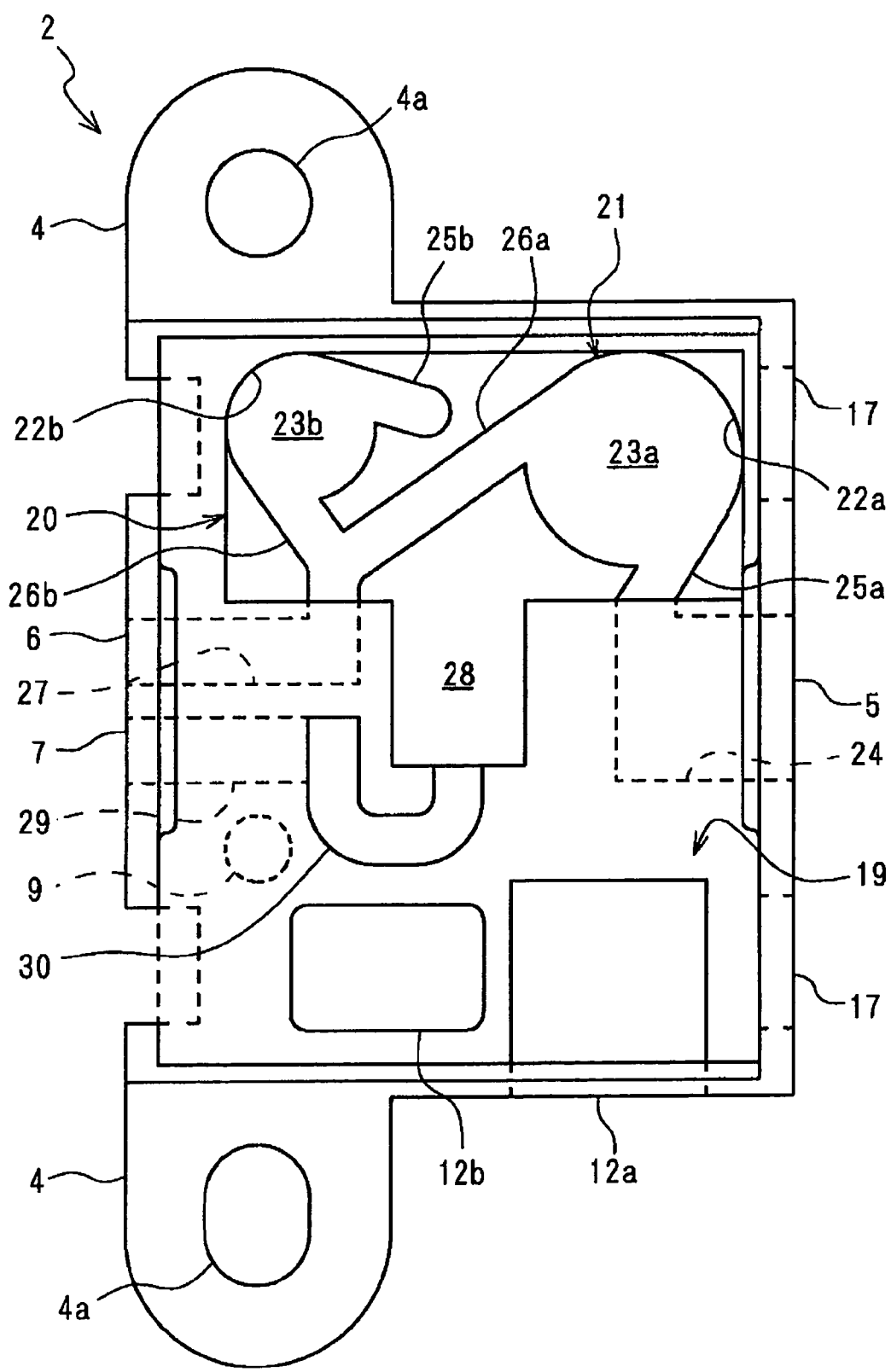
FIG. 4 is a plan view showing a housing in FIG. 3.

The housing 2 is provided on a side wall on the front with two elongate engagement holes 17, and on a side wall on the back with two engagement grooves 18, with which the hooks 10 engage. A recess 20 having the same thickness as that of the intermediate plate 14 is provided on a part of that inner wall of the first layer substrate 19, which defines a bottom wall, and a first layer flow passage 21 is defined by a groove provided on a bottom of the recess 20. As shown in FIG. 4, the first layer flow passage 21 includes two internal spaces 23a, 23b being recesses surrounded by curved (circular in the embodiment) wall surfaces 22a, 22b, respectively. Further, an introduction passage 25a connecting tangentially to an end of the wall surface 22a is provided to provide communication between an intake chamber 24 extending straight from the intake port 5 and the internal space 23a, and a discharge passage 26a connecting tangentially to the other end of the wall surface 22a extending along the wall surface 22a from the introduction passage 25a is communicated to a combined discharge passage 27, which is communicated to the first discharge port 6. Further, there are provided a blind introduction passage 25b connecting tangentially to an end of the wall surface 22b of the internal space 23b and a discharge passage 26b connecting tangentially to the other end of the wall surface 22b and connecting at 90 degrees to the discharge passage 26a to be communicated to the combined discharge passage 27. Further, there are provided a sensor chamber 28 formed by partially enlarging the recess 20 of the first layer substrate 19, a measurement discharge passage 29 extended from the second discharge port 7, and a sensor discharge passage 30 for connection of the sensor chamber 28 and the measurement discharge passage 29.

Figure 5:
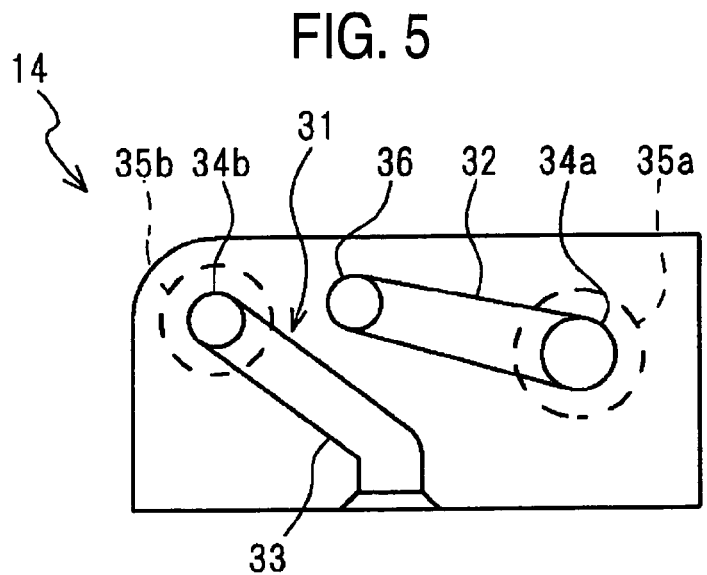
FIG. 5 is a plan view showing an intermediate plate in FIG. 3.
Figure 6:
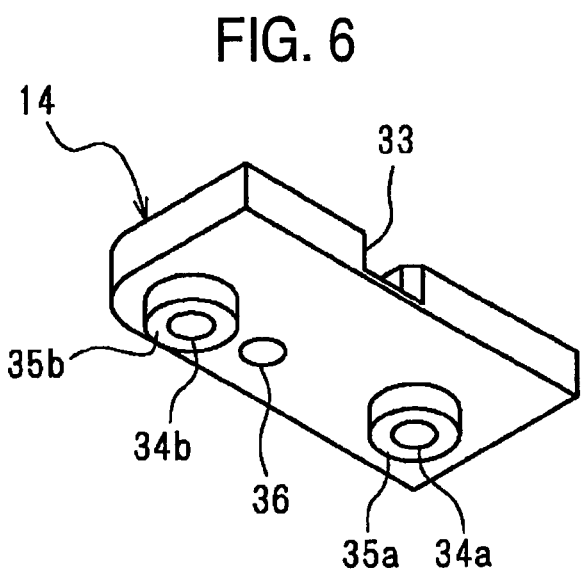
FIG. 6 is a perspective view showing a back surface of the intermediate plate in FIG. 3.

The intermediate plate 14 comprises a plate that engages with the recess 20 in the housing 2 to seal an upper portion of the first layer flow passage 21, and a second layer flow passage 31 is defined by grooves provided on an upper surface as shown in FIGS. 5 and 6, which shows an upper surface and a back surface. The second layer flow passage 31 comprises a first connection passage 32 and a second connection passage 33, and branch passages 34a, 34b extending through the intermediate plate 14 are provided at one ends of the first connection passage 32 and the second connection passage 33. The branch passages 34a, 34b include cylindrical portions 35a, 35b, openings of which project from the back surface of the intermediate plate 14, a communication hole 36 extending through the intermediate plate 14 is provided at the other end of the first connection passage 32, and the other end of the second connection passage 33 is opened to a side of the intermediate plate 14.

The packing 15 is made of thin rubber to seal the intermediate plate 14 and an upper portion of the sensor discharge passage 30 of the housing 2, and an upper portion of the sensor chamber 28 is provided in a sensor hole 37 to be opened.

Figure 7:
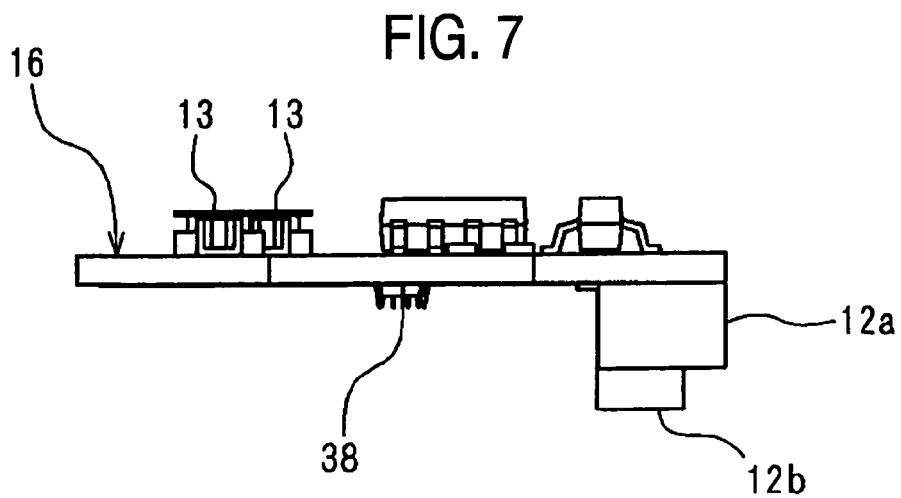
FIG. 7 is a side view showing a circuit substrate in FIG. 3.

The circuit substrate 16 comprises a printed board, which constitutes a measurement circuit with the trimmers 13 and other elements, and includes the connectors 12a, 12b. As shown in FIG. 7, a sensor element 38 for measurement of wind velocity with the use of a heating element is mounted to a back surface of the circuit substrate 16. The sensor element 38 extends through the sensor hole 37 of the packing 15 to be arranged inside the sensor chamber 28.

The cover 3 has engagement pawls 39 engaging with the engagement holes 17 of the housing 2 and has the hooks 10 engaging with the engagement grooves 18 so that the intermediate plate 14, the packing 15, and the circuit substrate 16 are fixed inside the housing 2 to attach closely to one another.

Figure 8:
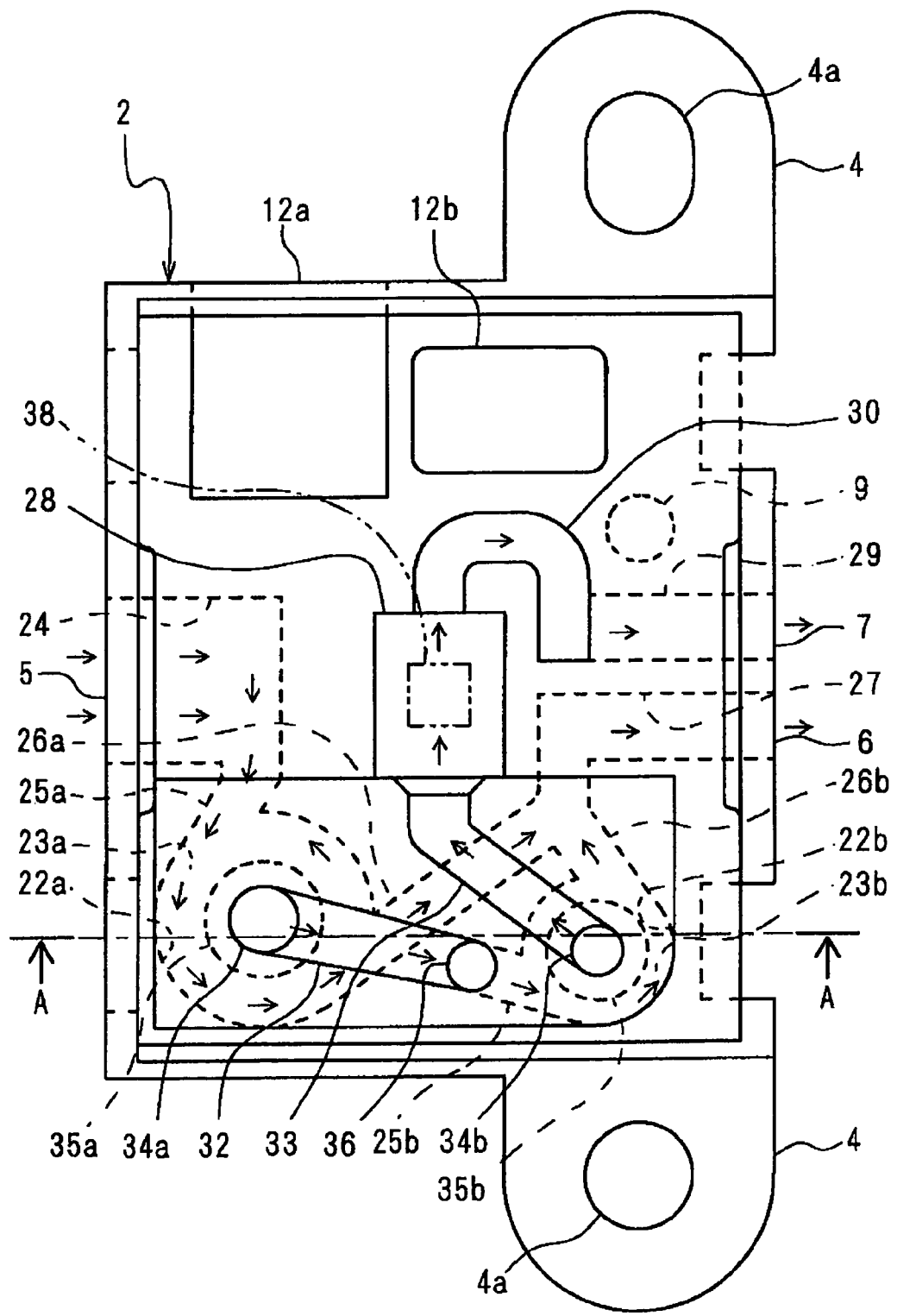
FIG. 8 is a plan view showing an arrangement of flow passages in the flow velocity measuring device of FIG. 1.
Figure 9:
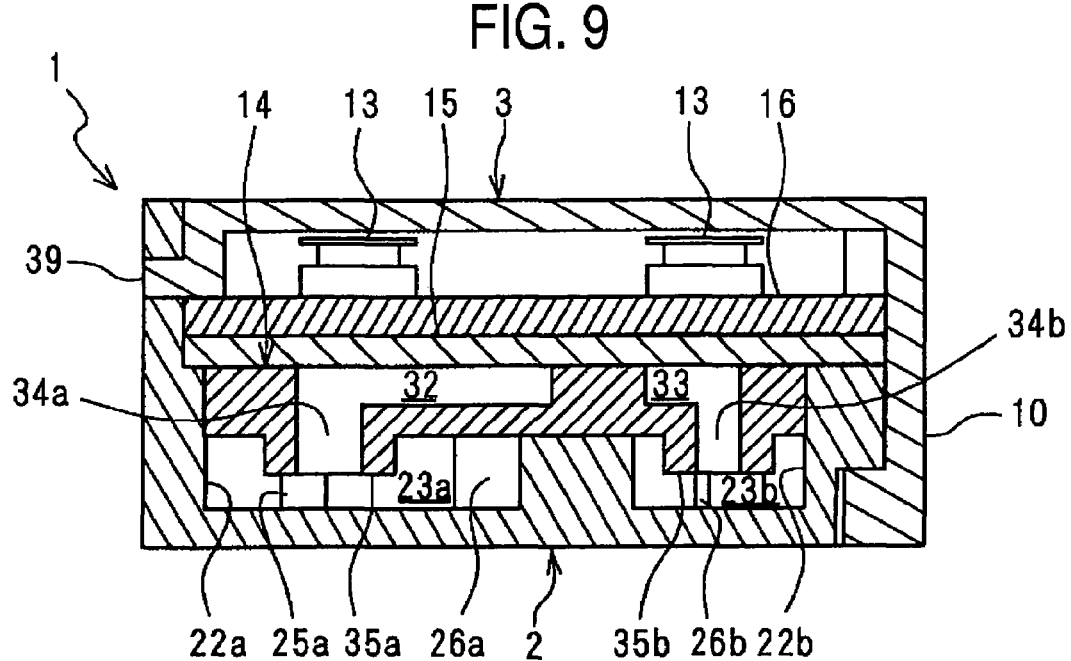
FIG. 9 is a view showing a cross section A—A in FIG. 8.

FIG. 8 is a plan view showing a state, in which the intermediate plate 14 is mounted in the recess 20 in the housing 2, and an explanation will be given to a configuration of flow passages in the flow velocity measuring device 1 in an assembled state. The cylindrical portions 35a, 35b on the intermediate plate 14 are positioned substantially centrally of the internal spaces 23a, 23b of the first layer flow passage 21, and the branch passages 34a, 34b, respectively, are connected to the internal spaces 23a, 23b from above. The internal space 23a is communicated to the first connection passage 32 of the second layer flow passage 31 through the branch passage 34a and further to the introduction passage 25b through the communication hole 36. The internal space 23b, to which the introduction passage 25b is connected, is communicated to one end of the second connection passage 33 of the second layer flow passage 31 through the branch passage 34b opened centrally of the internal space 23b, and the other end of the second connection passage 33 is communicated to the sensor chamber 28. Also, as shown in FIG. 9, which shows a cross section A—A in FIG. 8, the branch passages 34a, 34b are provided at right angle relative to a direction, in which the wall surfaces 22a, 22b are curved, and the cylindrical portions 35a, 35b project into the internal spaces 23a, 23b from above so that the branch passages 34a, 34b are opened at substantially a half of a height of the first layer flow passage 21.

Figure 10:
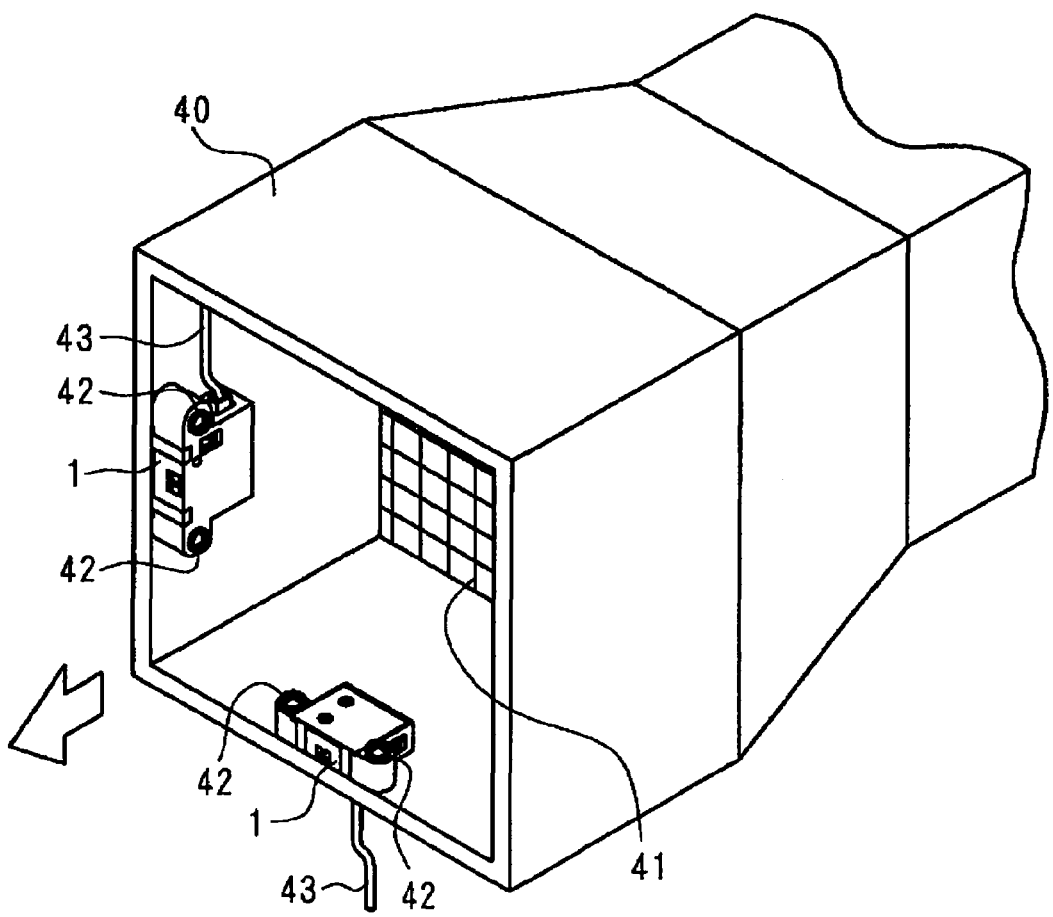
FIG. 10 is a perspective view showing a duct with the flow velocity measuring device of FIG. 1 mounted thereon.

FIG. 10 shows a state, in which two flow velocity measuring devices 1 are mounted in a duct 40. The duct 40 takes in an air through a filter 41 as indicated by an arrow. The flow velocity measuring devices 1 are fixed by means of screws 42 with intake ports 5 facing upstream of an air flows. The flow velocity measuring device 1 mounted to a side wall of the duct 40 has a wiring cord 43 for connection to an external equipment connected to the connector 12a, and the wiring cord 43 is wired in a manner to be trained on an inner wall of the duct 40. On the other hand, the flow velocity measuring device 1 mounted to a bottom wall of the duct 40 has a wiring cord 43, which extends through the bottom wall of the duct 40, connected to the connector 12b.

An explanation will be given to an air flow when the flow velocity of an air is measured by the flow velocity measuring device 1. As shown in FIG. 10, an air flow in the flow velocity measuring device 1 with the intake port 5 facing toward the wind is indicated by arrows in FIG. 8. When the flow velocity of an air outside the flow velocity measuring device 1 is 0.5 m/sec, an air taken into the intake chamber 24 from the intake port 5 passes through the introduction passage 25a, which is narrower than the intake port 5, to be accelerated to about 2 m/sec to blow into the internal space 23a along the wall surface 22a. The air having blown into the internal space 23a goes along the wall surface 22a and round an outer periphery of the internal space 23a to pass through the combined discharge passage 27 from the discharge passage 26a at the flow velocity of about 0.9 m/sec to be discharged outside the flow velocity measuring device 1 from the first discharge port 6. However, a part of the air having blown into the internal space 23a is not discharged from the discharge passage 26a but continues to go around within the internal space 23a, and passes through the branch passage 34a of the intermediate plate 14 at the flow velocity of about 0.4 m/sec to be conducted to the first connection passage 32. An air taken out from the branch passage 34a passes through the first connection passage 32 and further through the communication hole 36 to blow into the internal space 23b from the introduction passage 25b at the flow velocity of about 0.6 m/sec. In the same manner as in the internal space 23a, about 70% of the air having blown into the internal space 23b passes through the discharge passage 26b and the combined discharge passage 27 to be discharged from the first discharge port 6, and about 30% of the air passes through the branch passage 34b to flow into the second connection passage 33. An air taken out from the branch passage 34b is conducted to the sensor chamber 28, and the flow velocity of the air is measured by the sensor element 38. Since the flow velocity of an air in the sensor element 38 is determined by the flow velocity of an air taken in from the intake port 5, the flow velocity of an air outside the flow velocity measuring device 1 can be calculated. An air, the flow velocity of which has been measured by the sensor element 38 in the sensor chamber 28, is discharged outside from the second discharge port 7 through the sensor discharge passage 30 and the measurement discharge passage 29.

Figure 11:
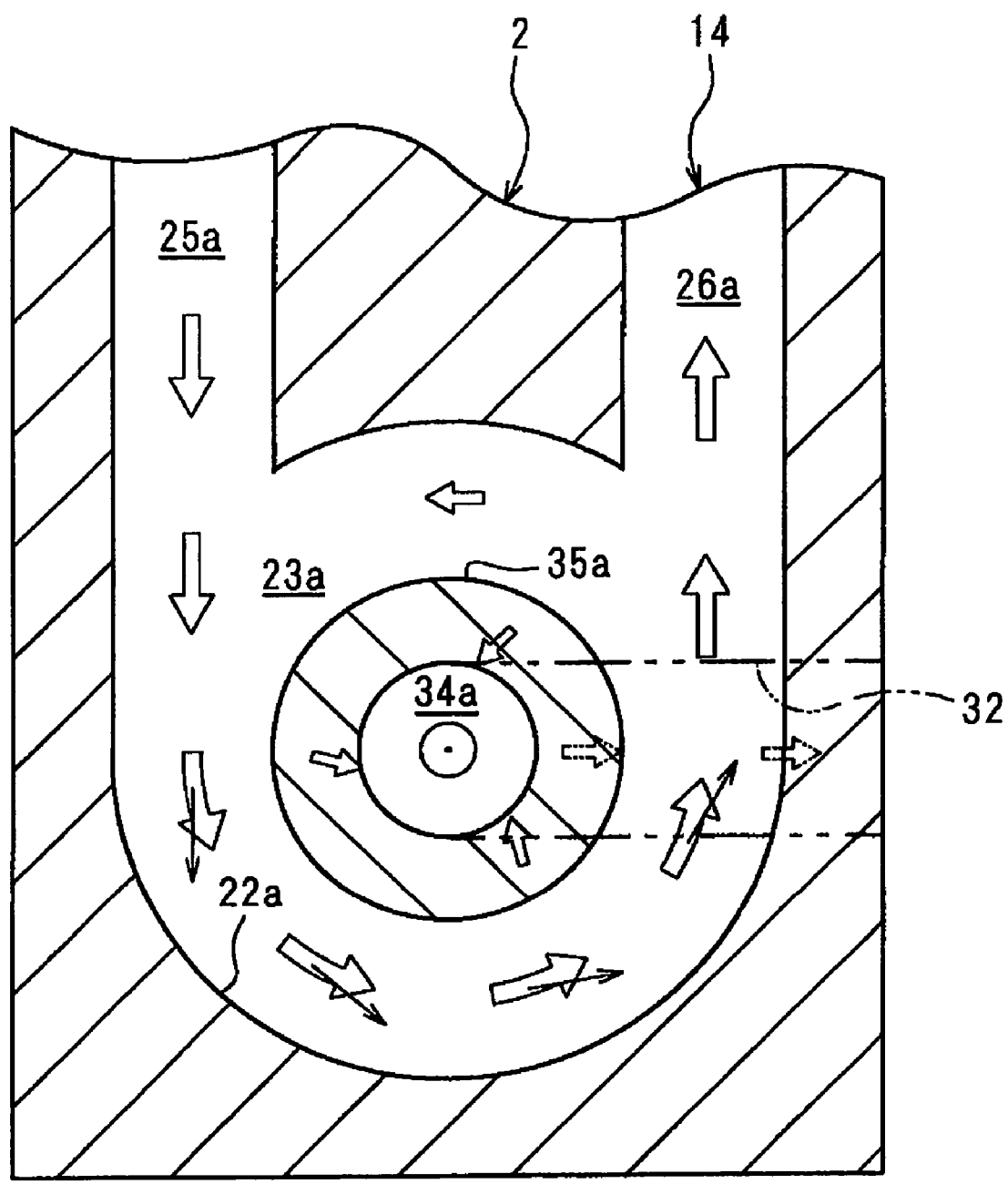
FIG. 11 is a horizontal, cross sectional view showing an internal space of FIG. 8 as simplified.
Figure 12:
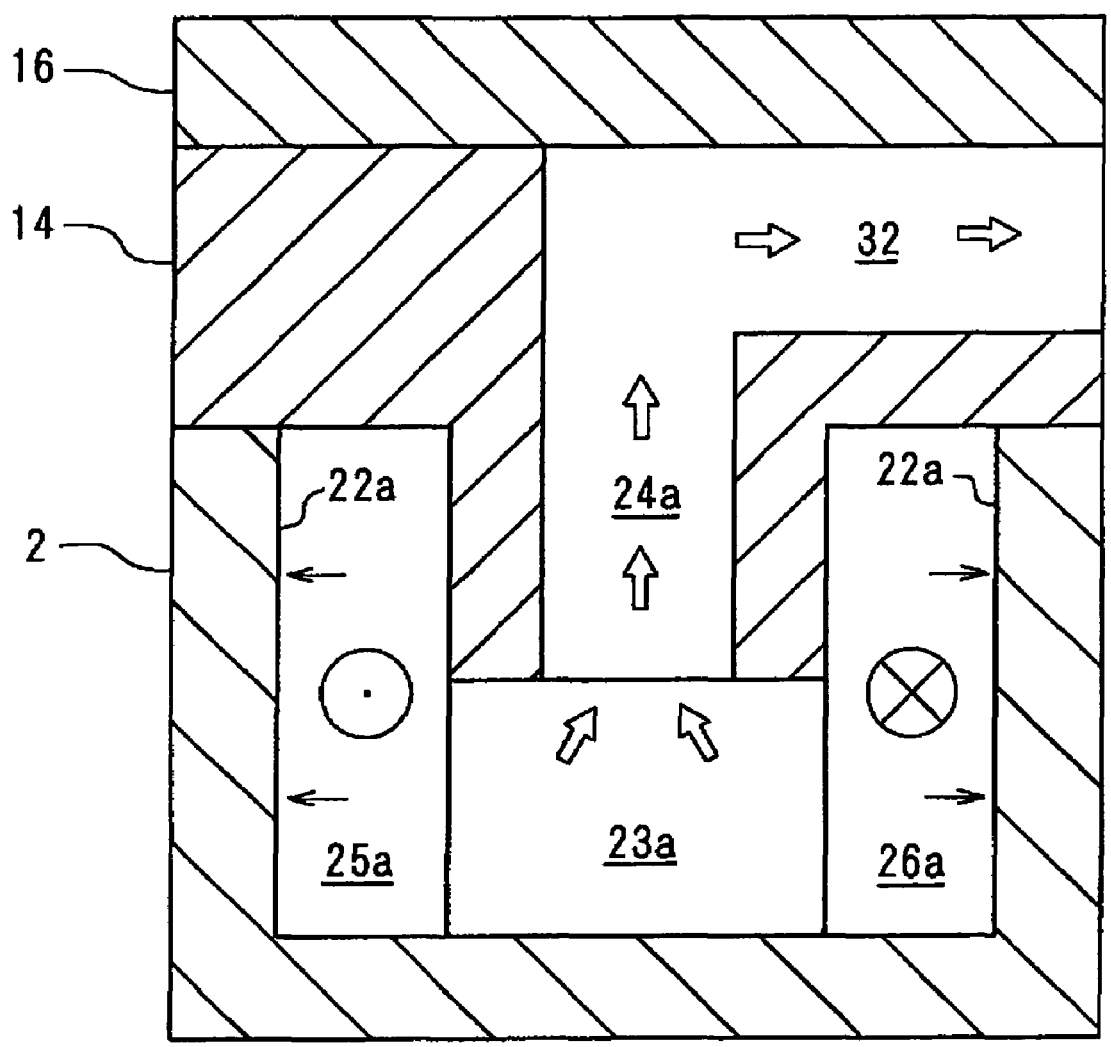
FIG. 12 is a vertical, cross sectional view showing an internal space of FIG. 8 as simplified.

Actions on an air in the internal spaces 23a, 23b will be described with reference to FIGS. 11 and 12, in which the internal space 23a is simplified and shown in horizontal cross section and vertical cross section. Here, the packing 15 is not shown because it is not necessarily an essential element. An air blowing into the internal space 23a from the introduction passage 25a flows in a manner indicated by blank arrows in the figures. The air flows along the wall surface 22a from the introduction passage 25a in a manner to describe an arc, and discharged mainly from the discharge passage 26a but a part of the air goes around within the internal space 23a. At this time, dust and dirt contained in the air will continue to go straight according to a law of inertia as indicated by single arrows in the figures. In the case where an air describes an arc as in the embodiment, the inertial force is understood to be a centrifugal force acting in a direction perpendicular to a wall surface. Therefore, dust and dirt in the air is deflected toward the wall surface 22a, so that a clean air with less dust and dirt are obtained at the center part of the internal space 23a. An air flowing near the wall surface 22a and containing much dust and dirt is discharged from the discharge passage 26a along the wall surface 22a, and the clean air present at the center part of the internal space 23a passes through the branch passages 34 to flow into the first connection passage 32. In the flow velocity measuring device 1, a branch ratio of an air quantity taken out from the branch passage 34a to an air quantity blowing into the internal space 23a from the introduction passage 25a is about 0.3.

Likewise, also within the internal space 23b, about 70% of an air having blown from the introduction passage 25b is discharged from the discharge passage 26b, and about 30% of the air is taken out from the branch passage 34b. Here, a centrifugal force acting on dust and dirt in an air, which goes around within the internal spaces 23a, 23b, is proportional to the square of the velocity thereof and inversely proportional to a round radius. In the flow velocity measuring device 1 according to the embodiment, since an air blowing into the internal space 23b amounts to only a part of an air blowing into the internal space 23a, the internal space 23b is made small to make a flow passage narrow to increase the flow velocity of an air and a flow passage is made small in radius, whereby a centrifugal force acting on dust and dirt contained in an air is prevented from being decreased. In this manner, a clean air, from which dust and dirt are removed, is taken out from the branch passage 34b to be conducted to the sensor chamber 28 through the second connection passage 33, and the flow velocity of the air is measured by the sensor element 38.

In the flow velocity measuring device 1, both a branch ratio in the internal space 23a and a branch ratio in the internal space 23b are about 0.3, and when such branch ratios are large, flows in radial directions of the internal spaces 23a, 23b to be directed to the branch passages 34a, 34b, respectively, from the introduction passages 25a, 25b are generated and flows along the wall surfaces 22a, 22 are decreased, so that dust and dirt cannot be removed favorably. Therefore, flows of an air along the wall surfaces 22a, 22 are preferably increased by making the branch ratios equal to or less than 0.5. Also, when the branch ratios are made excessively small, the flow velocity of an air in the sensor chamber 28 becomes too slow, and thus that change in output of the sensor element 38, which is caused by a difference in flow velocity, is made small and a gain becomes small. Therefore, the flow velocity measuring device 1 according to the invention is optimized by making the branch ratios small in a range, in which accuracy in air velocity measured by the sensor element 38 can be ensured, on the basis of a range of measurement, and shapes and sizes of flow passages.

When the flow velocity measuring device 1 is mounted with the intake port 5 disposed at the bottom in order to measure the flow velocity of an air flowing just above from below, the discharge passage 26a of the internal space 23a faces obliquely upwardly of the branch passage 34a, so that an air will flow out from the discharge passage 26a above the branch passage 34a. At this time, since gravitation acts on dust and dirt in the air a part of the dust and dirt separates in some cases from a flow along the wall surface 22a to fall in the branch passage 34a. According to the embodiment, however, since the discharge passage 26b of the internal space 23b connected in series so as to further branch an air, which has been branched in the internal space 23a, and then conduct the air to the sensor element 38, is arranged at right angle to the discharge passage 26a, the discharge passage 26b is directed obliquely downwardly of the branch passage 34b to be free from adverse influences as in the internal space 23a. Also, since even when the flow velocity measuring device 1 is mounted in any other direction, at least one of the internal space 23a and the internal space 23b can effectively discharge dust and dirt from the discharge passages 26a, 26b without being influenced by gravitation, a clean air is supplied to the sensor chamber 28 to eliminate degradation in accuracy due to adhesion and accumulation of dust and dirt on the sensor element 38. Further, when the internal spaces 23a, 23b are arranged in parallel, the trimmers 13 are used to adjust sensitivity to enable the flow velocity to be again measured with the use of the remaining flow passage even if large dust and heavy dirt should plug the flow passages.

Since the wall surfaces 22a, 22b are cylindrical-shaped, the inertial forces of an air and dust and dirt contained in the air are directed at right angle to the flow and in opposition to the wall surfaces 22a, 22b at all times, so that it is possible to efficiently curve the air flow without loss of the flow velocity to enable separation of dust and dirt in the air.

Also, since the openings of the branch passages 34a, 34b are defined in the cylindrical portions 35a, 35b projecting into the internal spaces 23a, 23b as shown in FIG. 7, an air blown from the introduction passages 25a, 25b can be guided from inside in a manner to flow along the wall surfaces 22a, 22b. Further, even when the flow velocity measuring device 1 is mounted to be turned upside down, and the branch passages 34a, 34b are extended downward from the internal spaces 23a, 23b, dust and dirt attracted by gravitation, in particular, heavy dust and dirt creepingly moving below the flow passage are blocked by the cylindrical portions 35a, 35b and so hard to enter the branch passages 34a, 34b. Also, in this case, there is a possibility that dust and dirt in upper portions of the cylindrical portions 35a, 35b fall in the branch passages due to gravitation. However, by arranging the internal spaces 23a, 23b, which are connected in parallel, at an angle of twist so as not to make the branch passages 34a, 34b in parallel to each other, the two internal spaces 23a, 23b are not mounted with the branch passages 34a, 34b disposed at the bottom at a time even when the flow velocity measuring device 1 is mounted in any direction, and either of them can effectively discharge dust and dirt without being adversely influenced by gravitation.

By laminating the housing 2, the intermediate plate 14, and the circuit substrate 16 to construct two planar flow passages composed of the first layer flow passage 21 and the second layer flow passage 31, and forming through-holes in the intermediate plate 14 to provide the branch passages 34a, 34b connected perpendicularly to the first layer flow passage 21 and the second layer flow passage 31, the flow velocity measuring device 1 is constructed to enable configuring a three-dimensional flow-passage even with an ordinary resin molding and readily realizing a construction including complicated flow passages having the effect described above.

Since the sensor chamber 28, the sensor discharge passage 30, and the measurement discharge passage 29 do not need a two-layered structure of flow passages, they are independent from the first layer flow passage 21 and the second layer flow passage 31 in the embodiment (they are also considered to be flow passages across both the first layer flow passage 21 and the second layer flow passage 31), but they may be provided in the second layer flow passage on the intermediate plate 14, or may be provided in the first layer flow passage by forming a further through-hole in the intermediate plate 14 of the second connection passage 33. Further, the flow velocity measuring device 1 can be manufactured further inexpensively since it is constructed such that the housing 2 accommodating therein elements for formation of flow passages and the circuit substrate 16 mounting thereon the sensor element 38 essential for measurement of flow velocity can be used as elements to constitute flow passages.

The invention can be widely used to measure the flow velocity of a fluid containing therein dust and dirt, such as detection of plugging of a filter, air-volume control of an air conditioning equipment.

The invention claimed is:

1. A flow velocity measuring device comprising a flow passage comprising:
    an internal space having a curved wall surface,
    an introduction passage connected to the internal space at one end of the wall surface tangentially to the wall surface,
    a discharge passage connected to the internal space at the other end of the wall surface tangentially to the wall surface, and
    a branch passage connected to the internal space at substantially right angle to a direction, in which the wall surface is curved, and
    a sensor element arranged in the branch passage or a flow passage connected to the branch passage, and
    wherein a fluid is introduced into the internal space from the introduction passage to branch into the discharge passage and the branch passage, and
    the flow velocity of the fluid taken out from the branch passage is measured by the sensor element, wherein
        at least two internal spaces are provided to be connected in series so that the fluid taken out from the branch passage connected to one of the internal spaces is conducted to the introduction passage connected to the other of the internal spaces.

2. The flow velocity measuring device according to claim 1, wherein the internal spaces are arranged in different directions so that a direction, in which one of the branch passages is connected to the internal space, and a direction, in which the other of the branch passages is connected to the internal space, and/or a direction, in which one of the discharge passages is connected to the internal space, and a direction, in which the other of the discharge passages is connected to the internal space, are different from each other.

3. The flow velocity measuring device according to claim 1, wherein a direction, in which one of the branch passages is connected to the internal space, and a direction, in which the other of the branch passages is connected to the internal space, and/or a direction, in which one of the discharge passages is connected to the internal space, and a direction, in which the other of the discharge passages is connected to the internal space, are different by 90 degrees or more from each other.

4. The flow velocity measuring device according to claim 1, wherein the internal space is cylindrical in shape.

5. The flow velocity measuring device according to claim 1, wherein the branch passage comprises a cylinder projecting into the internal space.

6. A flow velocity measuring device comprising a flow passage comprising:
   an internal space having a curved wall surface,
   an introduction passage connected to the internal space at one end of the wall surface tangentially to the wall surface,
   a discharge passage connected to the internal space at the other end of the wall surface tangentially to the wall surface, and
   a branch passage connected to the internal space at substantially right angle to a direction, in which the wall surface is curved, and
   a sensor element arranged in the branch passage or a flow passage connected to the branch passage, and
   wherein a fluid is introduced into the internal space from the introduction passage to branch into the discharge passage and the branch passage, and
   the flow velocity of the fluid taken out from the branch passage is measured by the sensor element, wherein
      at least two internal spaces are provided, and the branch passage connected to one of the internal spaces and the introduction passage connected to the other of the internal space are communicated to each other.

7. The flow velocity measuring device according to claim 6, wherein the internal spaces are arranged in different directions so that a direction, in which one of the branch passages is connected to the internal space, and a direction, in which the other of the branch passages is connected to the internal space, and/or a direction, in which one of the discharge passages is connected to the internal space, and a direction, in which the other of the discharge passages is connected to the internal space, are different from each other.

8. The flow velocity measuring device according to claim 6, wherein a direction, in which one of the branch passages is connected to the internal space, and a direction, in which the other of the branch passages is connected to the internal space, and/or a direction, in which one of the discharge passages is connected to the internal space, and a direction, in which the other of the discharge passages is connected to the internal space, are different by 90 degrees or more from each other.

9. A flow velocity measuring device comprising a first layer substrate, a second layer substrate, and an intermediate plate interposed between the first layer substrate and the second layer substrate,
   a first layer flow passage provided between the first layer substrate and the intermediate plate and including an internal space having a curved wall surface, an introduction passage connected to the internal space at one end of the wall surface tangentially to the wall surface, and a discharge passage connected to the internal space at the other end of the wall surface tangentially to the wall surface,
   a branch passage provided on the intermediate plate to extend through the intermediate plate to be connected to the internal space,
   a second layer flow passage provided between the intermediate plate and the second layer substrate to be connected to the branch passage,
   a sensor element provided on the first layer substrate or the second layer substrate to be arranged in the second layer flow passage or a flow passage connected to the second layer flow passage, and
   wherein a fluid is introduced into the internal space from the introduction passage to branch into the discharge passage and the branch passage, and
   the flow velocity of the fluid taken into the second layer flow passage from the branch passage is measured by the sensor element.

10. The flow velocity measuring device according to claim 9, wherein
    the second layer flow passage comprises a groove provided on the intermediate plate, and
    the second layer substrate comprises a circuit substrate provided with the sensor element and a circuit, which processes a signal input into or output to the sensor element.

11. The flow velocity measuring device according to claim 10, wherein the first layer substrate defines a part of a housing to accommodate therein the intermediate plate and the second layer substrate.

12. The flow velocity measuring device according to claim 9, wherein the first layer substrate defines a part of a housing to accommodate therein the intermediate plate and the second layer substrate.

13. The flow velocity measuring device according to claim 9, wherein
    the first layer flow passage includes at least two internal spaces,
    the intermediate plate is provided with a communication hole, which extends through the intermediate plate from the introduction passage connected to one of the internal spaces, and
    the second layer flow passage is arranged to provide communication between the branch passage connected to the other of the internal spaces and the communication hole.

14. The flow velocity measuring device according to claim 13, wherein directions of the discharge passages connected to the internal spaces are different by 90 degrees or more.

15. The flow velocity measuring device according to claim 9, wherein
    the first layer flow passage includes at least two internal spaces, and
    the second layer flow passage is arranged to provide communication between the branch passage connected to one of the internal spaces and the branch passage connected to the other of the internal spaces.

16. The flow velocity measuring device according to claim 15, wherein directions of the discharge passages connected to the internal spaces are different by 90 degrees or more.

17. The flow velocity measuring device according to claim 9, wherein the internal space is cylindrical-shaped.

18. The flow velocity measuring device according to claim 9, wherein the branch passage comprises a cylinder projecting into the internal space.

* * * * *